(12) United States Patent
Codreanu et al.

(10) Patent No.: US 7,627,347 B2
(45) Date of Patent: Dec. 1, 2009

(54) DATA TRANSMISSION PARAMETER OPTIMIZATION IN MIMO COMMUNICATIONS SYSTEM

(75) Inventors: Marian Ionee Codreanu, Oulu (FI); Antti Tölli, Oulu (FI); Markku Juntti, Oulu (FI); Matti Latva-Aho, Oulu (FI)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 11/378,683

(22) Filed: Mar. 17, 2006

(65) Prior Publication Data

US 2007/0218950 A1    Sep. 20, 2007

(51) Int. Cl.
*H04M 1/00* (2006.01)

(52) U.S. Cl. ............... 455/562.1; 455/561; 455/550.1; 455/403; 455/422.1

(58) Field of Classification Search .............. 455/562.1, 455/561, 550.1, 403, 422.1, 450, 452.1, 452.2
See application file for complete search history.

(56) References Cited

U.S. PATENT DOCUMENTS

| | | | |
|---|---|---|---|
| 6,662,024 B2 * | 12/2003 | Walton et al. ............. | 455/562.1 |
| 7,248,879 B1 * | 7/2007 | Walton et al. ............. | 455/452.2 |
| 2003/0087673 A1 * | 5/2003 | Walton et al. ............. | 455/562 |
| 2003/0125040 A1 * | 7/2003 | Walton et al. ............. | 455/454 |
| 2005/0101259 A1 | 5/2005 | Tong et al. | |
| 2005/0181833 A1 | 8/2005 | Lee et al. | |
| 2006/0034244 A1 | 2/2006 | Huang et al. | |
| 2006/0121946 A1 * | 6/2006 | Walton et al. ............. | 455/561 |
| 2007/0211786 A1 * | 9/2007 | Shattil ............. | 375/141 |
| 2008/0013638 A1 * | 1/2008 | Walton et al. ............. | 375/260 |

FOREIGN PATENT DOCUMENTS

WO    WO 2005/048486    5/2005

OTHER PUBLICATIONS

Vandenberghe et al., "Semidefinite Programming", Siam Review, Mar. 1996, pp. 1-50.
Boyd et al., "A Tutorial on Geometric Programming", Optimization and Engineering, Jul. 2005, pp. 1-69.
Viswanath et al., "Sum Capacity of the Vector Gaussian Broadcast Channel and Uplink-Downlink Duality", IEEE Transactions on Information Theory, vol. 49, No. 8, Aug. 2003, pp. 1912-1921.
Viswanath et al., "Opportunistic Beamforming Using Dumb Antennas", IEEE Transactions on Information Theory, vol. 48, No. 6, Jun. 2002, pp. 1277-1294.

(Continued)

*Primary Examiner*—Joseph H Feild
*Assistant Examiner*—Huy D Nguyen
(74) *Attorney, Agent, or Firm*—Hollingsworth & Funk, LLC

(57) ABSTRACT

A solution for optimizing beamforming configurations and transmit power allocation configurations in a telecommunication system comprising a base station and a plurality of user entities is provided. The base station and the user entities are capable of multiple-input multiple-output (MIMO) communications, i.e. capable of communicating through spatial subchannels. The base station calculates iteratively optimal beamforming configurations for the base station and for each user entity and transmit power allocation configurations for each spatial subchannel used in MIMO communications. The base station carries out the calculation on the basis of channel state information received from the user entities by utilizing the information on correlation of different spatial subchannels, i.e. interference between the subchannels, in order to update beamforming configurations and transmit power allocation configurations.

19 Claims, 2 Drawing Sheets

OTHER PUBLICATIONS

Figure 1:
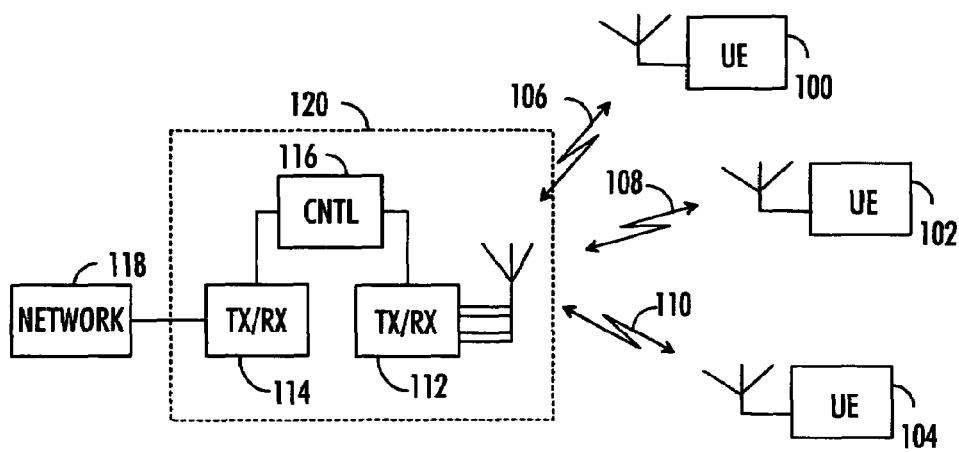

Jeffs et al., "MIMO Wireless Multipath Ray Parameter Estimation from Channel Transfer Matrix Measurements", In Acoustics, Speech, and Signal Processing, 2002, International Conference May 13-17, 2002.

* cited by examiner

DATA TRANSMISSION PARAMETER OPTIMIZATION IN MIMO COMMUNICATIONS SYSTEM

FIELD

The invention relates to optimizing data transmission parameters in a multiple-input multiple-output (MIMO) communications system.

BACKGROUND

The knowledge of channel state information (CSI) at the transmitter side can dramatically improve the performance (data rate, quality of service, spectral efficiency, etc.) of a multiple-input multiple-output (MIMO) antenna communications system. However, especially in case of a multi-user system, it is difficult to achieve full CSI knowledge at the transmitter side. A method for exploiting the multiuser diversity gain with very limited CSI feedback is the opportunistic beamforming technique proposed in P. Viswanath, D. N. C Tse, and R. Laroia, "Opportunistic beamforming using dumb antennas," IEEE Transactions on Information Theory, vol. 48, pp. 1277-1294, June 2002, which is incorporated herein as a reference. The base station (BS) generates random orthogonal beams (typically the number of beams is equal to the number of antennas at the base station) and each user computes and feedbacks to BS only a parameter that describes their channel quality in each beam, e.g., the signal-to-interference plus noise ratio (SINR) at the output of a linear minimum mean square error (LMMSE) receiver. Based on this information, the BS's scheduler unit associates with each beam the user that can exploit it the most efficiently; therefore, the full multiuser diversity gain is achieved.

It has been shown that in case of systems with very large numbers of users, the opportunistic beamforming performs very close to the optimum beamforming since for each generated beam it is very likely to find a user whose channels are almost perfectly matched. However, the performance deteriorates rapidly for systems with moderate to small numbers of users since, as the number of users decreases, it becomes more unlikely to find users that are almost perfectly aligned with the random generated beams.

BRIEF DESCRIPTION OF THE INVENTION

An object of the invention is to provide an improved solution for optimizing data transmission parameters of a base station and a plurality of user entities for transmitting and receiving data through spatial subchannels.

According to an aspect of the invention, there is provided a data transmission optimization method in a telecommunication system comprising a base station and one or more user entities. The method comprises initializing a base station beamforming configuration defining a plurality of spatial subchannels for uplink and downlink communication, allocating the plurality of spatial subchannels to one or more user entities, determining for each user entity a channel state information describing the correlation, and thereby interference, between the spatial subchannels, calculating for each user entity a user entity beamforming configuration configuring each user entity to transmit and receive data through the spatial subchannel or subchannels allocated to the corresponding user entity, calculating an uplink power allocation configuration on the basis of the previously calculated user entity beamforming configuration, the channel state information, and the previously calculated base station beamforming configuration, the uplink power allocation configuration defining the relative amount of transmit power allocated to each spatial subchannel for uplink communication, updating the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, calculating a downlink power allocation configuration on the basis of the previously updated base station beamforming configuration, the channel state information, and the user entity beamforming configuration, updating the user entity beamforming configuration by utilizing the information on correlation between spatial subchannels comprised in the channel state information of each spatial subchannel and the previously updated base station beamforming configuration and the previously calculated downlink power allocation configuration, thereby mitigating interference between different subchannels, repeating iteratively the operations of calculating the new uplink power allocation configuration, updating the base station beamforming configuration, calculating the downlink power allocation configuration, and updating the user entity beamforming configuration a given number of times according to a specific criterion, and utilizing, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannel allocated to the corresponding user entity, and the uplink power allocation configuration in configuring each user entity to transmit and receive data through the one or more spatial subchannels allocated to the corresponding user entity.

According to another aspect of the invention, there is provided a base station of a telecommunication system, comprising a communication interface comprising a plurality of antennas for enabling data transmission through a plurality of spatial subchannels. The base station further comprises a processing unit configured to initialize a base station beamforming configuration defining a plurality of spatial subchannels for uplink and downlink communication, allocate the plurality of spatial subchannels to one or more user entities, obtain for each user entity a channel state information describing the correlation, and thereby interference, between different spatial subchannels, obtain for each user entity a user entity beamforming configuration configuring each user entity to transmit and receive data through the spatial subchannel or spatial subchannels allocated to the corresponding user entity, calculate an uplink power allocation configuration on the basis of the previously updated user entity beamforming configuration, the channel state information, and the previously updated base station beamforming configuration, update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, calculate a downlink power allocation configuration on the basis of the previously updated base station beamforming configuration, the channel state information, and the user entity beamforming configuration, update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, repeat the operations of calculating the uplink power allocation configuration, updating the base station beamforming configuration, calculating the downlink power allocation configuration, updating the user entity beamforming configuration a given number of times according to a specific criterion, and utilize, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannel allocated to the corresponding user entity, and the uplink power allocation configuration in configuring each user entity to transmit and receive data through the one or more spatial subchannels allocated to the corresponding user entity.

According to another aspect of the invention, there is provided a telecommunication system comprising a base station and a plurality of user entities. The base station comprises a communication interface comprising a plurality of antennas for enabling data transmission through a plurality of spatial subchannels, and a processing unit configured to initialize a base station beamforming configuration defining a plurality of spatial subchannels for uplink and downlink communication, allocate the plurality of spatial subchannels to one or more user entities, receive for each user entity a channel state information describing the correlation, and thereby interference, between different spatial subchannels, obtain for each user entity a user entity beamforming configuration configuring each user entity to transmit and receive data through the spatial subchannel or spatial subchannels allocated to the corresponding user entity, calculate an uplink power allocation configuration on the basis of the previously updated user entity beamforming configuration, the channel state information, and the previously updated base station beamforming configuration, update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, calculate a downlink power allocation configuration on the basis of the previously updated base station beamforming configuration, the channel state information, and the user entity beamforming configuration, update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, repeat the operations of calculating the uplink power allocation configuration, updating the base station beamforming configuration, calculating the downlink power allocation configuration, updating the user entity beamforming configuration a given number of times according to a specific criterion, and utilize, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannel allocated to the corresponding user entity, and the uplink power allocation configuration in configuring each user entity to transmit and receive data through the one or more spatial sub-channel allocated to the corresponding user entity. Each of the plurality of user entities of the telecommunication system comprises a communication interface comprising a plurality of antennas for enabling data transmission through a plurality of spatial subchannels, and a processing unit configured to calculate the channel state information receive spatial subchannel allocation information defining one or more spatial subchannels allocated to the user entity, transmit the channel state information to the base station, upon reception of the spatial subchannel allocation information, and receive an updated beamforming configuration and transmit power configuration for each spatial subchannel allocated to the user entity from the base station for use in data transmission through the one or more spatial subchannel allocated to the user entity.

According to another aspect of the invention, there is provided a computer program distribution medium readable by a computer and encoding a computer program of instructions for executing a computer process for data transmission optimization in a telecommunication system comprising a base station and one or more user entities. The process comprises initializing a base station beamforming configuration defining a plurality of spatial subchannels for uplink and downlink communication, allocating the plurality of spatial subchannels to one or more user entities, obtaining for each user entity channel state information describing the correlation, and thereby interference, between the spatial subchannels, obtaining for each user entity a user entity beamforming configuration configuring each user entity to transmit and receive data through the spatial subchannel or spatial subchannels allocated to the corresponding user entity, calculating an uplink power allocation configuration on the basis of the previously calculated user entity beamforming configuration, the channel state information, and the previously calculated base station beamforming configuration, the uplink power allocation configuration defining the relative amount of transmit power allocated to each spatial subchannel for uplink communication, updating the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, calculating a downlink power allocation configuration on the basis of the previously updated base station beamforming configuration, the channel state information, and the user entity beamforming configuration, updating the user entity beamforming configuration by utilizing the information on correlation between spatial subchannels comprised in the channel state information of each spatial subchannel and the previously updated base station beamforming configuration and the previously calculated downlink power allocation configuration, thereby mitigating interference between different subchannels, repeating iteratively the operations of calculating the new uplink power allocation configuration, updating the base station beamforming configuration, calculating the downlink power allocation configuration, and updating the user entity beamforming configuration a given number of times according to a specific criterion, and utilizing, after the completion of the last iteration, the last update of the base station beamforming configuration and the downlink power allocation configuration in configuring the base station to transmit and receive data through the plurality of spatial subchannels and the last update of the user entity beamforming configuration and the uplink power allocation configuration in configuring each user entity to transmit and receive data through the one or more spatial subchannels allocated to the corresponding user entity.

The invention provides a computationally efficient solution for centralized optimization of beamforming configurations and transmit power allocation configurations of a base station and user entities capable of multiple-input multiple-output (MIMO) communication.

LIST OF DRAWINGS

Figure 2:
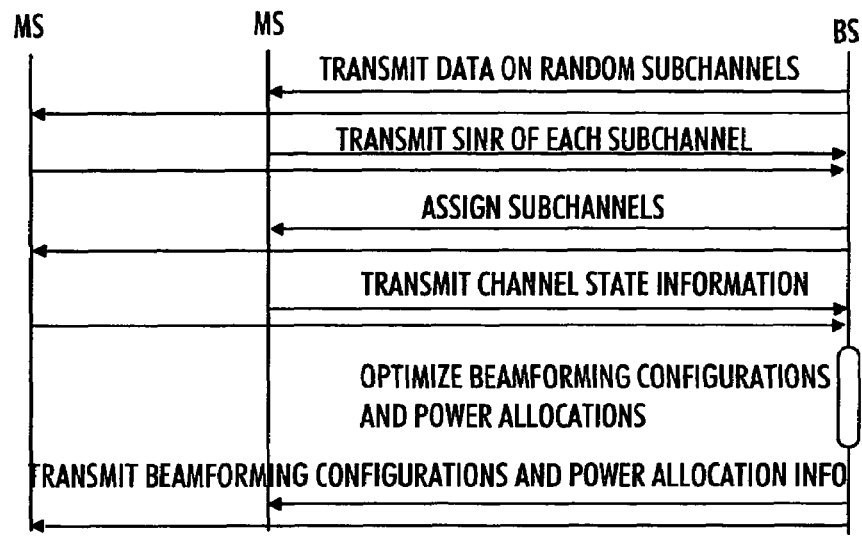
Figure 3:
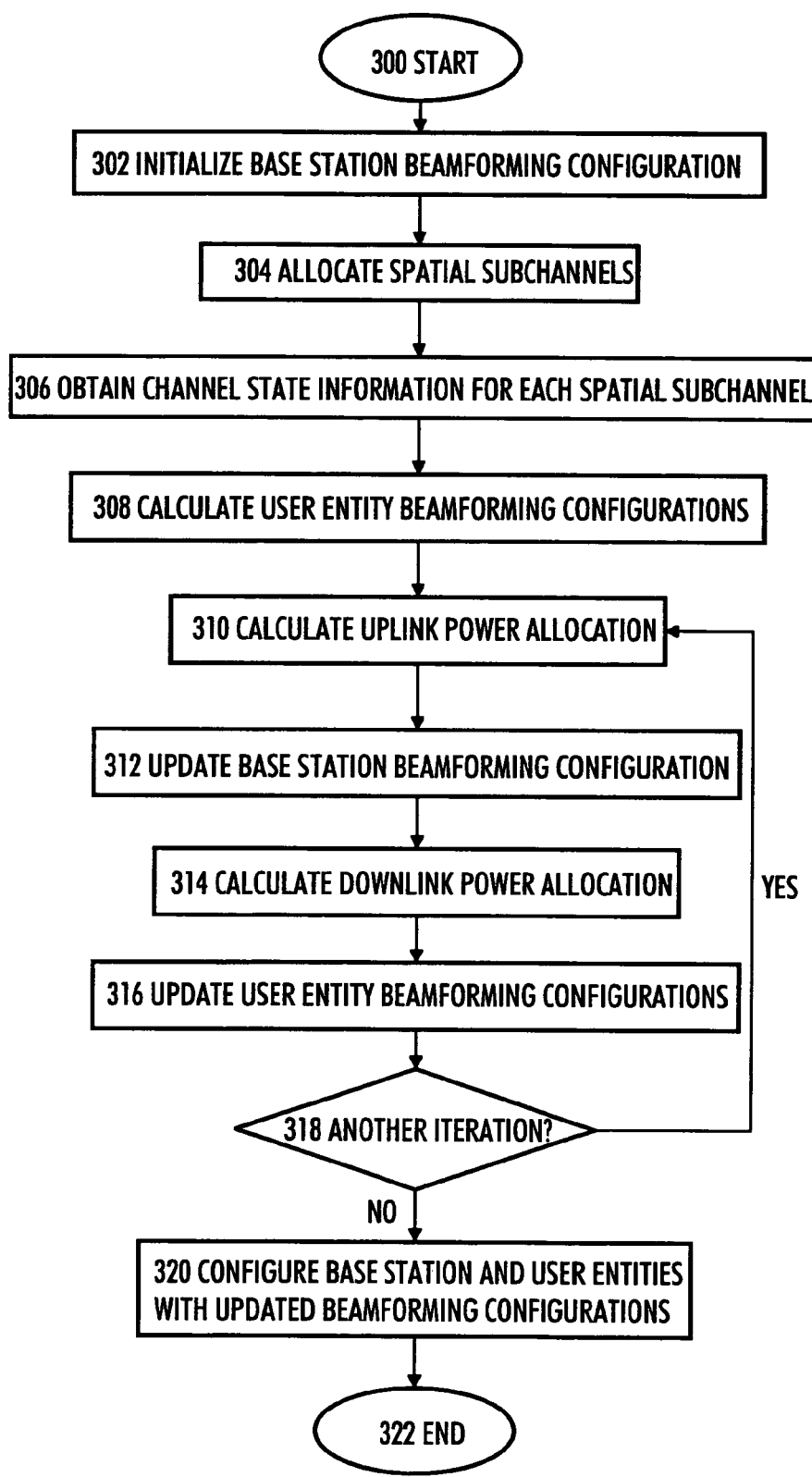

In the following, the invention will be described in greater detail with reference to the embodiments and the accompanying drawings, in which FIG. 1 illustrates a communication system in which embodiments of the invention may be implemented;

FIG. 2 illustrates a signaling diagram for configuring a base station and user entities for data transmission according to an embodiment of the invention, and FIG. 3 illustrates a flow diagram of a process for optimizing beamforming configurations and transmit power configurations of a base station and user entities according to an embodiment of the invention.

DESCRIPTION OF EMBODIMENTS

With reference to FIG. 1, let us examine an example of a wireless telecommunication system to which embodiments of the invention can be applied. A base station 120 communicates with a number of user entities 100, 102, 104 over wireless communication links 106, 108, 110, respectively. The communication may be based on, for example, orthogonal frequency division multiplexing (OFDM) technique but the invention is not limited to that.

Each of the user entities 100, 102, 104 comprise capability to transmit and receive information signals transmitted over the communication links 106, 108, 110, respectively. The user entities 100, 102, 104 comprise a plurality of antennas for enabling multiple input multiple output (MIMO) transmission and reception of signals.

The user entities 100, 102, 104 further comprise a processing unit to control functions of the user entities 100, 102, 104. The processing unit handles establishment, operation and termination of radio connections in the user entities 100, 102, 104. The processing unit controls reception of information by controlling the processing of reception signals. The processing unit may be implemented by a digital signal processor with suitable software embedded in a computer readable medium, or by separate logic circuits, for example with ASIC (Application Specific Integrated Circuit).

The base station 120 may be a base transceiver station of a mobile communication system, such as UMTS (Universal Mobile Telecommunications System), or an access point to WLAN (Wireless Local Area Network). The base station 120 comprises a first communication interface 112 to provide an air interface connection 108 to one or several user entities 100, 102, 104. The first communication interface 112 comprises a plurality of antennas for enabling MIMO transmission and reception of signals.

The base station 120 further comprises a second communication interface 114 to provide a wired connection to the network 118 of the telecommunication system. The network of the telecommunication system may provide connections to other networks, such as the Internet.

The base station 120 further comprises a processing unit 116 to control functions of the base station 120. The processing unit 116 handles establishment, operation and termination of radio connections with the user entities 100, 102, 104 the base station 120 is serving. The base station 120 also provides user entities 100, 102, 104 with information related to the data transmission from/to the user entities 100, 102, 104. The information may comprise information transmission parameters the user entities 100, 102, 104 should use in data transmission. The processing unit 116 may be implemented by a digital signal processor with suitable software embedded in a computer readable medium, or by separate logic circuits, for example with ASIC (Application Specific Integrated Circuit).

Next, configuration of a base station and one or more user entities communicating with the base station for MIMO data transmission according to an embodiment of the invention is described. In fact, the configuration comprises optimizing beamforming configurations and transmit powers of the base station and the one or more user entities.

The base station may communicate with the user entities through multiple spatial subchannels. The spatial subchannels are created by directing the multiple antennas of the base station to transmit data streams of different user entities into different spatial subchannels, i.e. into different directions from the base station. Each user may also comprise a plurality of antennas used for controlling the directivity of transmitted or received radio signals. This is achieved by adjusting phases and magnitudes of the signals transmitted or received through the antennas. The adjustment is defined with a beamforming configuration which may be a beamforming matrix (when the beamforming configuration concerns several spatial subchannels) or vector. Sometimes, the beamforming configuration is referred to as a beamformer in the art.

A given user entity is able to receive the radio signals in a spatial subchannel or subchannels directed towards the user entity but the user entity also receives signals scattered from the other spatial subchannels. The signals in the other spatial subchannels appear as interference to the user entity. The amount of interference depends on the beamforming configurations at the base station and at the user entity but also on transmission powers of signals in spatial subchannels. This is also valid in uplink. The ability of the base station to discriminate signals transmitted through different spatial subchannels depends on the beamforming configurations at the base station and at each user entity employing one or more of the spatial subchannels and on the transmission powers the user entities use in the transmission. Therefore, the beamforming configurations and the transmit powers of the base station and the user entities should be optimized in order to mitigate interference between different spatial subchannels.

Next, configuration of beamforming configurations and transmit powers of both the base station and the user entities will be described with reference to FIG. 2. In order to determine the allocation of spatial subchannels, the base station may transmit a different data stream to a plurality of subchannels. As mentioned above, the spatial subchannels are determined by the beamforming configuration of the base station, i.e. the following base station beamforming matrix:

$$V^{(0)} = [v_1^{(0)} \ldots v_s^{(0)}], \quad (1)$$

where S is the number of data streams, i.e. the number of spatial subchannels. Each beamforming vector $v^{(0)}$ defines a different spatial subchannel. The vectors may be initialized arbitrarily. Preferably, the different subchannels should, however, be mutually orthogonal. Initially, the base station may transmit data streams of every spatial subchannel according to the following power allocation vector:

$$p^{(0)} = [p_1^{(0)} \ldots p_s^{(0)}], \quad (2)$$

where $p_1$ describes the transmit power of spatial subchannel 1, etc. Initially, data streams of every spatial subchannel may be transmitted with the same transmit power. The data streams transmitted through the spatial subchannels may be pilot sequences. A different pilot sequence may be transmitted through each spatial subchannel in order to enable the user entities to discriminate different spatial subchannels.

A plurality of user entities receive the spatial subchannels. Each of the plurality of user entities then calculates a signal-to-interference plus noise power ratio (SINR) values for each spatial subchannel. Any SINR calculation scheme known in the art may be utilized for obtaining the SINR values. Each user entity may also calculate a reception beamforming configuration for each spatial subchannel. The reception beamforming configuration may be calculated according to a scheme known in the art. For example, a linear minimum mean square error (LMMSE) based reception algorithm may be utilized at each user entity. Each user entity also calculates channel state information comprising information on a radio channel between a given user entity and the base station. The channel state information may be a channel matrix obtained on the basis of the following equation:

$$y_k = H_k x + n_k, \quad (3)$$

where $y_k$ is a signal vector received by the $k^{th}$ user entity, $H_k$ is the channel state information, i.e. the channel matrix, experienced by the $k^{th}$ user entity, x is a transmitted signal vector and n represents noise. Since the transmitted signal is known to the user entity, it can estimate the channel matrix, which is well known in the art. The channel state information $H_k$ may be used when calculating the LMMSE reception algorithm. The size of the channel matrix $H_k$ depends on the number of antennas in the user entity and on the length of a channel impulse response. As is commonly known in the art, a covariance matrix may be calculated from the channel matrix $H_k$, which comprises correlation information between different spatial subchannels. The more correlation exists between different spatial subchannels, the more they interfere with one another. Therefore, the channel state information may be utilized when calculating a suitable beamforming configuration which mitigates interference between different spatial subchannels.

Each of the plurality of user entities then transmits the SINR values of every spatial subchannel to the base station. Alternatively, each user entity may transmit only a portion of the SINR values, for example a few highest SINR values.

The base station may then compare the SINR values received from the user entities and allocate the spatial subchannels to the user entities on the basis of the received SINR values. The base station may allocate each spatial subchannel to the user entity that receives the spatial subchannel with the highest SINR. The base station may allocate multiple spatial subchannels to a single user entity.

The base station may then inform the user entities of the spatial subchannels allocated to them. Each user entity may be informed of which one or more spatial subchannels are assigned to the user entity.

The user entities for which a spatial subchannel or subchannels have been allocated may then transmit their instantaneous channel state information $H_k$ to the base station. On the basis of the received channel state information $H_k$ received from each user k, the base station may calculate a beamforming configuration of each user entity with the LMMSE receiver algorithm as described above. Alternatively, each user entity may transmit its own beamforming configuration, since it has already calculated it. The base station may then collect the beamforming configurations of the user entities into a user entity beamforming matrix:

$$U^{(0)} = [u_1^{(0)} \ldots u_s^{(0)}], \quad (4)$$

where $u_1$ is the beamforming configuration of the user entity assigned with the spatial subchannel 1, etc. The base station may also have collected the SINR values transmitted by the user entities into a SINR vector according to the spatial subchannel allocation as:

$$\gamma_{dl}^{(0)} = [\gamma_1^{(0)} \ldots \gamma_s^{(0)}] \quad (5)$$

Accordingly, $\gamma_1$ is the SINR transmitted by the user entity assigned with the spatial subchannel 1.

The base station also has the downlink power allocation vector defined in (2) and comprising transmit powers of the spatial subchannels. On the basis of this knowledge, the base station may start optimizing beamforming configurations for the base station, i.e. beamforming matrix V, and the user entities, i.e. beamforming matrix U, and power allocation configurations of spatial subchannels for both uplink and downlink communications in order to mitigate the interference between different spatial subchannels. The optimization procedure will be described in more detail below.

When the optimization procedure has been carried out, the obtained beamforming configurations and transmit power allocation configurations are utilized in data transmission. At least some of them may be utilized in actual MIMO data transmission. The base station may use the optimized base station beamforming configuration V for transmitting/receiving data to/from the spatial subchannels, i.e. for configuring directivity of signals transmitted/received through antennas of the base station. Additionally, the base station may utilize the optimized downlink power allocation configuration to transmit data streams into the spatial subchannel with optimized transmit power levels. The base station may transmit the user entity beamforming configurations and uplink power level allocation configurations to the corresponding user entities for them to use these configurations in data transmission/reception through the allocated spatial subchannels. For example, the user entity assigned with the spatial subchannels 1 and 2 receives beamforming configurations and uplink transmit power values for the spatial subchannels 1 and 2 from the base station. The user entity may then use beamforming configuration of spatial subchannel 1 and 2 when transmitting or receiving data through spatial subchannel 1 and 2, respectively. Consequently, the user entity may use power allocation value of spatial subchannel 1 and 2 when transmitting data through spatial subchannel 1 and 2, respectively.

The beamforming configuration and transmit power configuration optimization procedure according to an embodiment of the invention will now be described with the reference to the flow diagram of FIG. 3. The procedure starts in block 300.

Operations carried out in blocks 302 to 308 may be performed as described above. Accordingly, the base station beamforming configuration is initialized in block 302. The base station beamforming configuration, i.e. the beamforming matrix, may be initialized with random values, for example. The vectors of the beamforming matrix should, however, be mutually orthogonal. Data streams (pilot sequences) are then transmitted to a plurality of user entities through a plurality of spatial subchannels defined by the initialized beamforming configuration. The plurality of user entities receive the transmitted data streams through each plurality of spatial subchannels and calculate beamforming vectors for each spatial subchannel by utilizing an LMMSE receiver solution. The user entities also calculate a SINR value for each of the plurality of spatial subchannels. The user entities transmit the SINR values to the base station.

In block 304, the base station assigns the spatial subchannels to the user entities on the basis of received SINR values and informs the user entities of the assignment. A given user entity may be assigned one or more spatial subchannels while another user entity may be assigned no spatial subchannel.

Each user entity for which a spatial subchannel or subchannels have been allocated then transmits instantaneous channel state information (channel matrix $H_k$) to the base station. In block 306, the base station obtains the channel state information $H_k$ from each of the user entities for which a spatial subchannel has been allocated. The base station then calculates the beamforming configurations for each user entity on the basis of the received channel state information $H_k$ in block 308. The base station then collects the calculated beamforming configurations into a user entity beamforming configuration $U^{(0)}$ (equation (3)) and received SINR values into a SINR vector $\gamma_{dl}^{(0)}$ (equation (4)). Alternatively, the base station may collect the initial user entity beamforming configuration $U^{(0)}$ from the beamforming configurations received from each user entity. The base station has also the initial downlink power allocation configuration in the downlink power allocation vector $p^{(0)}$ (equation (2)).

Now, the base station may calculate an optimal configuration for uplink power allocation by taking advantage of reciprocity of the radio channel and of an uplink-downlink duality property of SINR in conjunction with power allocation. This property of SINR ensures that for a given uplink channel exists an uplink transmit power allocation configuration which achieves the same SINR values as in downlink. Now that the base station has downlink SINR values in SINR vector $\gamma_{dl}^{(0)}$, it may calculate an uplink transmit power allocation configuration which gives the same SINR values for respective spatial subchannels. The power allocation may be calculated, for example, according to an algorithm described in P. Viswanath and D. N. C. Tse, "Sum capacity of the vector Gaussian broadcast channel and uplink-downlink duality", IEEE Transaction on Information Theory, vol. 49, no. 8, pp. 1912-1921, August 2003, which has been incorporated herein as a reference. The power allocation may be calculated according to a given criterion which may, for example, be maximization of a minimum SINR value among the SINR values associated with the spatial subchannels, maximization of a geometric mean value of the SINR values, minimization of a weighted sum mean square error approximation, minimization of a sum power required to satisfy a target SINR, or maximization of achievable SINR values. With respect to each criterion described above, a maximum allowable total transmit power (sum power) has to be taken into account. For the first 3 criteria, the power update may be calculated according to an algorithm described in S. Boyd, S. J. Kim, L. Vandenberghe, and A. Hassibi, "A tutorial on geometric programming," to appear in optimization and Engineering, available currently online at www.stanford.edu/~boyd/research.html and in L. Vandenberghe and S. Boyd, "Semidefinite programming", SIAM Review, 38(1): 49-95, March 1996, which have been incorporated herein as a reference. For the latter 2 criteria, the power update may be calculated according to an algorithm described in P. Viswanath and D. N. C. Tse, "Sum capacity of the vector Gaussian broadcast channel and uplink-downlink duality" mentioned above. The base station calculates the uplink power allocation configuration in block 310. The power allocation configuration actually describes uplink transmit power levels for each spatial subchannel and may be described as:

$$q^{(1)} = [q_1^{(1)} \ldots q_s^{(1)}] \qquad (6)$$

Now that the uplink power allocation configuration has been calculated, the base station beamforming configuration may not be optimal anymore and it should be improved in order to better mitigate the interference between different spatial subchannels. In block 312, the base station beamforming configuration is updated. When updating the base station beamforming configuration, the base station may now consider that the user entities are transmitting data with the user entity beamforming configuration $U^{(0)}$ and with transmit powers according to the uplink power allocation configuration $q^{(1)}$. The base station may also utilize the channel state information $H_k$ received from the user entities in calculation of the update of the base station beamforming configuration. While the channel state information $H_k$ are downlink channel state information received from the user entities, the same channel state information may be utilized in uplink by calculating a complex conjugate transpose of the channel matrix $H_k$. This is possible due to the reciprocity of the radio channel. The updated base station beamforming configuration may be calculated, for example, according to the following normalized LMMSE receiver solution known in the art:

$$v_s^{(1)} = \frac{\tilde{v}_s^{(1)}}{\|\tilde{v}_s^{(1)}\|_2}, \qquad (7)$$

$$\tilde{v}_s^{(1)} = q_s^{(1)} (u_s^{(0)})^H H_{k_s} \left( \sum_{s=1}^{S} q_s^{(1)} H_{k_s}^H u_s^{(0)} (u_s^{(0)})^H H_{k_s} + I \right)^{-1}$$

where index s defines the spatial subchannel for which the update of v is calculated, $q_s$ is the uplink transmit power calculated above for the spatial subchannel s, $H_{ks}$ is the channel matrix of the spatial subchannel transmitted by user entity k, i.e. the channel state information transmitted by user k, u is the user entity beamforming configuration for that user entity, and $(\ )^H$ denotes a complex conjugate transpose operation. The first part of the equation (7) is simply a power normalization of the result of the LMMSE algorithm. Equation (7) is calculated for every spatial subchannel and, thus, updated base station beamforming configuration $V^{(1)}$ is obtained. In practice, the LMMSE receiver algorithm according to equation (7) attempts to remove correlation between the spatial subchannel s being processed and the other subchannels. The less correlation there is between the spatial subchannel, the less they interfere with one another. As mentioned above, the correlation information is contained in the channel matrix H. The interference is mitigated by calculating the alignment of the spatial subchannel, i.e. the beamforming configuration for the spatial subchannel that is less susceptible to interference caused by the other spatial subchannels.

Now that the base station beamforming configuration has been updated to $V^{(1)}$, the base station may calculate new SINR values which are obtainable with the previously calculated user entity beamforming configuration $U^{(0)}$, base station beamforming configuration $V^{(1)}$, and the uplink power allocation configuration $q^{(1)}$. Actually, the base station estimates SINR values that could be obtained if the user entities would transmit data according to the beamforming configuration $U^{(0)}$ and the uplink power allocation configuration $q^{(1)}$ through the spatial subchannels described by the channel state informations $H^H$ (uplink channels) and if the base station would receive the transmitted data with the base station beamforming configuration $V^{(1)}$. The SINR calculation may be calculated according to an algorithm known in the art. Thus, a SINR vector $Y_{ul}^{(0)}$ comprises the uplink SINR values for each spatial subchannel.

Now, consideration is turned to downlink. The previously calculated SINR values $Y_{ul}^{(0)}$ may be utilized in updating the downlink power allocation configuration $p^{(0)}$. Again, the duality property of SINR described above may be utilized. Accordingly, it is possible to a calculate downlink power allocation which achieves the same SINR values as in the uplink SINR vector $Y_{ul}^{(0)}$. The downlink power allocation configuration calculation may be carried out according to a specific criterion as described above with the uplink power allocation calculation and according to the scheme described in the reference (P. Viswanath and D. N. C. Tse, "Sum capacity of the vector Gaussian broadcast channel and uplink-downlink duality"), for example. The downlink power allocation calculation is carried out in block 314 in FIG. 3. Thus, an updated downlink power allocation vector $p^{(1)}$ is obtained.

With the updated base station beamforming configuration $V^{(1)}$ and the downlink power allocation configuration, i.e. the power allocation vector $p^{(1)}$, the user entity beamforming configuration $U^{(0)}$ may not be optimal anymore. Therefore, the user entity beamforming configuration $U^{(0)}$ may have to be updated. The update may be carried out according to the LMMSE receiver solution of equation (7) by replacing user entity beamforming vectors $u_s^{(0)}$ with the corresponding, previously calculated base station beamforming vectors $v_s^{(1)}$, uplink transmit power $q_s^{(1)}$ with the corresponding downlink transmit power $p_s^{(1)}$ and using the original downlink channel matrices $H_{ks}$. Thus, an updated user entity beamforming configuration $U^{(1)}$ is obtained. The update of user entity beamforming configuration is carried out in block 316.

Now new downlink SINR values $Y_{dl}^{(1)}$ may be calculated on the basis of the updated beamforming configurations $V^{(1)}$ and $U^{(1)}$, the updated downlink power allocation configuration and the channel state information.

Then, a new iteration of updating the uplink power allocation configuration to $q^{(2)}$, updating the base station beamforming configuration to $V^{(2)}$, updating the downlink power allocation configuration to $p^{(2)}$, and updating the user entity beamforming configuration to $U^{(2)}$ may be carried out. Each iteration may be carried out as described above. In block 318, it is determined whether or not to carry out another iteration. Advantageously, multiple, i.e. at least two, iterations should be carried out in order to improve the performance of MIMO communications. The performance of the optimization process typically improves exponentially such that the best improvement is achieved during the first few iterations, and the gained improvement per one iteration decreases as more iterations are computed. The performance may be measured with improvement in calculated SINR values. The number of iterations may be fixed in order to avoid unnecessary calculations or the number of iterations may be determined according to a given criterion. The criterion may be, for example, improvement of calculated SINR values. The iterations may be carried out as long as there is at least a given degree of improvement in values of one or both of the calculated SINR vectors $Y_{dl}$ and $Y_{ul}$. Other criteria are also possible. If it is determined that another iteration should be performed, the process returns to block 310. Otherwise, the process moves to block 320.

When it is determined that additional iterations are not necessary, at least some of the previously updated beamforming configurations and power allocation configurations may be utilized in actual data transmission through the spatial subchannels 1 to S in block 320. The base station may be configured with the previously calculated update of the base station beamforming configuration V and update of the downlink power allocation configuration p. Additionally, the base station may transmit to each user entity a beamforming vector of user entity beamforming configuration U and an uplink transmit power allocation value of uplink power allocation configuration q according to the allocated spatial subchannels.

The process ends in block 322.

Updating blocks 310 to 318 may be carried out in the base station by utilizing the obtained channel state information H and user entity beamforming configuration U. Therefore, the base station may carry out the optimization procedure itself without unnecessary data transmission or communication with the user entities.

The beamforming configuration and power allocation configuration optimization described above may be seen as alternate update of alignment and power of the spatial subchannels. At first, the spatial subchannels are initialized with given alignments defined by U and V and a given downlink transmit power allocation p. Then, an uplink transmit power allocation q suitable for this alignment is calculated. Now, the alignment may have to be adjusted according to the newly calculated uplink power allocation q by updating base station beamforming configuration V. Then, a new downlink power allocation p suitable for this new alignment is calculated and, after that, the alignment is once again adjusted by updating the user entity beamforming configuration U. Thereafter, a new uplink power allocation q is calculated and the process continues iteratively this way.

The embodiments of the invention may be realized in a base station comprising a communication interface and a processing unit operationally connected to the processing unit. The processing unit may be configured to perform at least some of the steps described in connection with the flowchart of FIG. 3 and in connection with FIG. 2. The embodiments may be implemented as a computer program comprising instructions for executing a computer process for data transmission optimization in a telecommunication system comprising a base station and one or more user entities.

The computer program may be stored on a computer program distribution medium readable by a computer or a processor. The computer program medium may be, for example, a magnetic or semiconductor system, device or medium. The computer program medium may include at least one of the following media: a computer readable medium, a computer readable memory, a random access memory, and an erasable programmable read-only memory.

Even though the invention has been described above with reference to an example according to the accompanying drawings, it is clear that the invention is not restricted thereto but it can be modified in several ways within the scope of the appended claims.

The invention claimed is:

1. A base station of a telecommunication system, comprising:
   a communication interface comprising a plurality of antennas for enabling data transmission through a plurality of spatial subchannels, and a processing unit configured to:
initialize a base station beamforming configuration defining a plurality of spatial subchannels for uplink and downlink communication,
allocate the plurality of spatial subchannels to one or more user entities,
obtain for each user entity a channel state information describing the correlation, and thereby interference, between different spatial subchannels,
obtain for each user entity a user entity beamforming configuration configuring each user entity to transmit and receive data through the spatial subchannel or spatial subchannels allocated to the corresponding user entity,
calculate an uplink power allocation configuration on the basis of the previously updated user entity beamforming configuration, the channel state information, and the previously updated base station beamforming configuration,
update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels
calculate a downlink power allocation configuration on the basis of the previously updated base station beamforming configuration, the channel state information, and the user entity beamforming configuration,
update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels;
repeat the operations of calculating the uplink power allocation configuration, updating the base station beamforming configuration, calculating the downlink power allocation configuration, updating the user entity beamforming configuration a given number of times according to a specific criterion, and
utilize, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannel allocated to the corresponding user entity, and the uplink power allocation configuration in configuring each user entity to transmit and receive data through the one or more spatial subchannels allocated to the corresponding user entity.

2. The base station of claim 1, wherein the processing unit is further configured to calculate for each user entity the user entity beamforming configuration on the basis of the channel state information received from each user entity.

3. The base station of claim 1, wherein the processing unit is further configured to receive, through the communication interface, from each one or more user entities the user entity beamforming configuration and the channel state information related to the spatial subchannel or subchannels allocated to each one or more user entities.

4. The base station of claim 1, wherein the processing unit is further configured to calculate a signal-to-interference plus noise ratio value for each spatial subchannel after every update of base station beamforming configuration, calculate the downlink power allocation configuration that achieves the calculated signal-to-interference plus noise ratio values, calculate a signal-to-interference plus noise ratio value for each spatial subchannel after every update of user entity beamforming configuration, and calculate the uplink power allocation configuration that achieves the calculated signal-to-interference plus noise ratio values.

5. The base station of claim 1, wherein the processing unit is further configured to repeat the updating operations and the power allocation configuration calculation operations a fixed number of times.

6. The base station of claim 1, wherein the processing unit is further configured to calculate a performance improvement value after each repeat of the updating operations and the power allocation configuration calculation operations and determine on the basis of the performance improvement value whether or not to carry out another repeat of the updating operations and the power allocation configuration calculation operations.

7. The base station of claim 6, wherein the processing unit is further configured to calculate a signal-to-interference plus noise ratio value for each spatial subchannel after every update of base station beamforming configuration or update of user entity beamforming configuration, and determine an improvement in the signal-to-interference plus noise ratio by comparing the newly calculated signal-to-interference plus noise ratio value with the previously calculated signal-to-interference plus noise ratio.

8. A base station of a telecommunication system, comprising:
communication means for enabling data transmission through a plurality of spatial subchannels;
means for initializing a base station beamforming configuration defining a plurality of spatial subchannels for uplink and downlink communication;
means for allocating the plurality of spatial subchannels to one or more user entities;
means for obtaining for each spatial subchannel channel state information describing the correlation, and thereby interference, between the spatial subchannels;
means for obtaining for each user entity a user entity beamforming configuration configuring each user entity to transmit and receive data through the spatial subchannel or spatial subchannels allocated to the corresponding user entity;
means for calculating an uplink power allocation configuration on the basis of the previously calculated user entity beamforming configuration, the channel state information, and the previously calculated base station beamforming configuration, the uplink power allocation configuration defining the relative amount of transmit power allocated to each spatial subchannel for uplink communication;
means for updating the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels;
means for calculating a downlink power allocation configuration on the basis of the previously updated base station beamforming configuration, the channel state information, and the user entity beamforming configuration;

means for updating the user entity beamforming configuration by utilizing the information on correlation between spatial subchannels comprised in the channel state information of each spatial subchannel and the previously updated base station beamforming configuration and the previously calculated downlink power allocation configuration, thereby mitigating interference between different subchannels;

means for repeating iteratively the operations of calculating the uplink power allocation configuration, updating the base station beamforming configuration, calculating the downlink power allocation configuration, and updating the user entity beamforming configuration a given number of times according to a specific criterion; and means for utilizing, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannel allocated to the corresponding user entity, and the uplink power allocation configuration in configuring each user entity to transmit and receive data through the one or more spatial subchannels allocated to the corresponding user entity.

9. A telecommunication system comprising a base station and a plurality of user entities, the base station comprising:

a communication interface comprising a plurality of antennas for enabling data transmission through a plurality of spatial subchannels, and a processing unit configured to initialize a base station beamforming configuration defining a plurality of spatial subchannels for uplink and downlink communication, allocate the plurality of spatial subchannels to one or more user entities, receive for each user entity a channel state information describing the correlation, and thereby interference, between different spatial subchannels, obtain for each user entity a user entity beamforming configuration configuring each user entity to transmit and receive data through the spatial subchannel or spatial subchannels allocated to the corresponding user entity, calculate an uplink power allocation configuration on the basis of the previously updated user entity beamforming configuration, the channel state information, and the previously updated base station beamforming configuration, update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, calculate a downlink power allocation configuration on the basis of the previously updated base station beamforming configuration, the channel state information, and the user entity beamforming configuration, update the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels, repeat the operations of calculating the uplink power allocation configuration, updating the base station beamforming configuration, calculating the downlink power allocation configuration, updating the user entity beamforming configuration a given number of times according to a specific criterion, and utilize, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannel allocated to the corresponding user entity, and the uplink power allocation configuration in configuring each user entity to transmit and receive data through the one or more spatial subchannel allocated to the corresponding user entity, and each of the plurality of user entities of the telecommunication system comprising:

a communication interface comprising a plurality of antennas for enabling data transmission through a plurality of spatial subchannels, and a processing unit configured to calculate the channel state information, receive spatial subchannel allocation information defining one or more spatial subchannels allocated to the user entity, transmit the channel state information to the base station, upon reception of the spatial subchannel allocation information, and receive an updated beamforming configuration and transmit power configuration for each spatial subchannel allocated to the user entity from the base station for use in data transmission through the one or more spatial subchannel allocated to the user entity.

10. A computer program distribution medium readable by a computer and encoding a computer program of instructions for executing a computer process for data transmission optimization in a telecommunication system comprising a base station and one or more user entities, the process comprising:

initializing a base station beamforming configuration defining a plurality of spatial subchannels for uplink and downlink communication;

allocating the plurality of spatial subchannels to one or more user entities;

obtaining for each user entity channel state information describing the correlation, and thereby interference, between the spatial subchannels;

obtaining for each user entity a user entity beamforming configuration configuring each user entity to transmit and receive data through the spatial subchannel or spatial subchannels allocated to the corresponding user entity;

calculating an uplink power allocation configuration on the basis of the previously calculated user entity beamforming configuration, the channel state information, and the previously calculated base station beamforming configuration, the uplink power allocation configuration defining the relative amount of transmit power allocated to each spatial subchannel for uplink communication;

updating the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels;

calculating a downlink power allocation configuration on the basis of the previously updated base station beamforming configuration, the channel state information, and the user entity beamforming configuration;

updating the user entity beamforming configuration by utilizing the information on correlation between spatial subchannels comprised in the channel state information of each spatial subchannel and the previously updated base station beamforming configuration and the previously calculated downlink power allocation configuration, thereby mitigating interference between different subchannels;

repeating iteratively the operations of calculating the new uplink power allocation configuration, updating the base station beamforming configuration, calculating the downlink power allocation configuration, and updating the user entity beamforming configuration a given number of times according to a specific criterion; and utilizing, after the completion of the last iteration, the last update of the base station beamforming configuration and the downlink power allocation configuration in configuring the base station to transmit and receive data through the plurality of spatial subchannels and the last update of the user entity beamforming configuration and the uplink power allocation configuration in configuring each user entity to transmit and receive data through the one or more spatial subchannels allocated to the corresponding user entity.

11. The computer program distribution medium of claim 10, the distribution medium including at least one of the following media: a computer readable medium and a computer readable memory.

12. A method comprising:

initializing a base station beamforming configuration defining a plurality of spatial subchannels for uplink and downlink communication;

allocating the plurality of spatial subchannels to one or more user entities;

determining for each user entity a channel state information describing the correlation, and thereby interference, between the spatial subchannels;

calculating for each user entity a user entity beamforming configuration configuring each user entity to transmit and receive data through the spatial subchannel or subchannels allocated to the corresponding user entity;

calculating an uplink power allocation configuration on the basis of the previously calculated user entity beamforming configuration, the channel state information, and the previously calculated base station beamforming configuration, the uplink power allocation configuration defining the relative amount of transmit power allocated to each spatial subchannel for uplink communication;

updating the base station beamforming configuration by utilizing the information on correlation between spatial subchannels comprised in the channel state information of each spatial subchannel and the previously calculated user entity beamforming configuration and uplink power allocation configuration, thereby mitigating interference between different subchannels;

calculating a downlink power allocation configuration on the basis of the previously updated base station beamforming configuration, the channel state information, and the user entity beamforming configuration;

updating the user entity beamforming configuration by utilizing the information on correlation between spatial subchannels comprised in the channel state information of each spatial subchannel and the previously updated base station beamforming configuration and the previously calculated downlink power allocation configuration, thereby mitigating interference between different subchannels;

repeating iteratively the operations of calculating the new uplink power allocation configuration, updating the base station beamforming configuration, calculating the downlink power allocation configuration, and updating the user entity beamforming configuration a given number of times according to a specific criterion, and utilizing, after the completion of the last iteration, at least one of the following in configuring data transmission parameters: last update of the base station beamforming configuration in configuring the base station to transmit and receive data through the plurality of spatial subchannels, the downlink power allocation configuration in configuring the base station transmit power levels for the spatial subchannels, the last update of the user entity beamforming configuration in configuring each user entity to transmit and receive data through the one or more spatial subchannels allocated to the corresponding user entity, and the uplink power allocation configuration in configuring each user entity to transmit and receive data through the one or more spatial subchannels allocated to the corresponding user entity.

13. The method of claim 12, wherein the operation of calculating for each user entity the user entity beamforming configuration is carried out in the base station on the basis of the channel state information received from each user entity.

14. The method of claim 12, wherein the operation of calculating for each user entity the user entity beamforming configuration is carried out in each user entity and transmitted to the base station.

15. The method of claim 12, wherein the operations of updating the base station beamforming configuration, calculating the downlink power allocation configuration, updating user entity beamforming configuration, and calculating the uplink power allocation are performed in the base station.

16. The method of claim 12, further comprising: calculating a downlink signal-to-interference plus noise ratio value for each spatial subchannel after every update of base station beamforming configuration and calculating the downlink power allocation configuration that achieves the calculated signal-to-interference plus noise ratio values; and calculating an uplink signal-to-interference plus noise ratio value for each spatial subchannel after every update of user entity beamforming configuration and calculating the uplink power allocation configuration that achieves the calculated signal-to-interference plus noise ratio values.

17. The method of claim 12, wherein the number of times the updating operations and the power allocation configuration calculation operations are repeated is a fixed value.

18. The method of claim 12, wherein the number of times the updating operations and the power allocation configuration calculation operations are repeated depends on a performance improvement calculated after every repeat.

19. The method of claim 18, further comprising calculating a signal-to-interference plus noise ratio value for each spatial subchannel after every update of base station beamforming configuration or update of user entity beamforming configuration and determining an improvement in the signal-to-interference plus noise ratio by comparing the newly calculated signal-to-interference plus noise ratio value with the previously calculated signal-to-interference plus noise ratio.

* * * * *